US005209664A

United States Patent [19]

Wilcox, Michael A. J.

[11] Patent Number: 5,209,664

[45] Date of Patent: May 11, 1993

[54] ARTIST'S PALETTE

[76] Inventor: Michael A. J. Wilcox, 18 Edmondson Crescent, Karrinyup, Western Australia

[21] Appl. No.: 691,023

[22] PCT Filed: Dec. 22, 1989

[86] PCT No.: PCT/AU89/00553

§ 371 Date: Aug. 22, 1991

§ 102(e) Date: Aug. 22, 1991

[87] PCT Pub. No.: WO90/07431

PCT Pub. Date: Jul. 12, 1990

[30] Foreign Application Priority Data

Dec. 23, 1988 [AU] Australia .............................. PJ2113

[51] Int. Cl.⁵ .............................................. G09B 11/10

[52] U.S. Cl. ..................................... 434/103; 206/1.8; 434/84; 434/98

[58] Field of Search ............................ 434/84, 98, 103; 206/575, 1.7, 1.8

[56] References Cited

U.S. PATENT DOCUMENTS 2,878,590 3/1959 Dodge ............................ 206/1.8 X
3,815,265 6/1974 DePauw .......................... 206/1.7 X
4,027,404 6/1977 Brant ............................... 206/1.8 X
4,911,642 3/1990 Knowles .............................. 434/84

FOREIGN PATENT DOCUMENTS 593943 2/1978 U.S.S.R. .............................. 206/1.7

*Primary Examiner*—Gene Mancene
*Assistant Examiner*—L. Thomas
*Attorney, Agent, or Firm*—Eckert Seamans Cherin & Mellott

[57] ABSTRACT

An artist's palette of any suitable configuration having at least three pairs of designated areas (A,B,C) in an adjacent relationship. Each pair of areas provided to receive a first color. Each designated area (11, 12, 13, 14, 15, 16) of each pair having a directional indica towards the adjacent pair of designated areas. Each designated area of each pair being provided to receive a first color with a second color bias wherein adjacent designated areas of adjacent pairs having directional indica towards each other and receive a first color having a common second color bias. The palette having at least three areas (17, 18, 19) positioned between adjacent pairs of designated areas to receive a second color. The second color created by combining the first colors having a common second color bias in adjacent designated areas.

24 Claims, 6 Drawing Sheets

ARTIST'S PALETTE

BACKGROUND OF THE INVENTION

This invention relates to an artist's palette.

Hitherto artist's palettes have given little or no guidance concerning the mixing of colours. Generally the artist when mixing colours applies them in a random fashion, or according to personal preference on the palette. The palette being an unmarked surface on which to apply colour and mix. Guidance on the mixing of the colours usually being taken from the Three Primary System which is taught universally. In fact there are no true primary colours. Each blue has a bias towards violet or green, each yellow has a bias towards orange or green and each red has a bias towards violet or orange. By providing three pairs of designated areas on a palette it is possible to place the appropriately biased "primary" colours in an arrangement which guides the artist in the mixing of the colours.

Thus in one form the invention resides in an artist's palette of any suitable configuration having at least three pairs of designated areas in an adjacent relationship; each pair of designated areas being provided to receive a first colour; each designated area of each pair having directional indicia towards the adjacent pair of designated areas, each designated area of each pair being provided to receive a first colour with an second colour bias wherein adjacent designated areas of adjacent pairs having directional indicia towards each other and receive a first colour having a common second colour bias; said palette having at least three areas, each area positioned between adjacent pairs of designated areas; each area being provided to receive a second colour created by combining the first colours having a common second colour bias in adjacent designated areas.

In another form the invention resides in a colour mixing guide comprising an artist's palette of the form as described above.

The invention will be better understood by reference to the following description of one specific embodiment thereof with reference to the accompanying drawings in which;

DETAILED DESCRIPTION OF THE DRAWINGS

Figure 1:
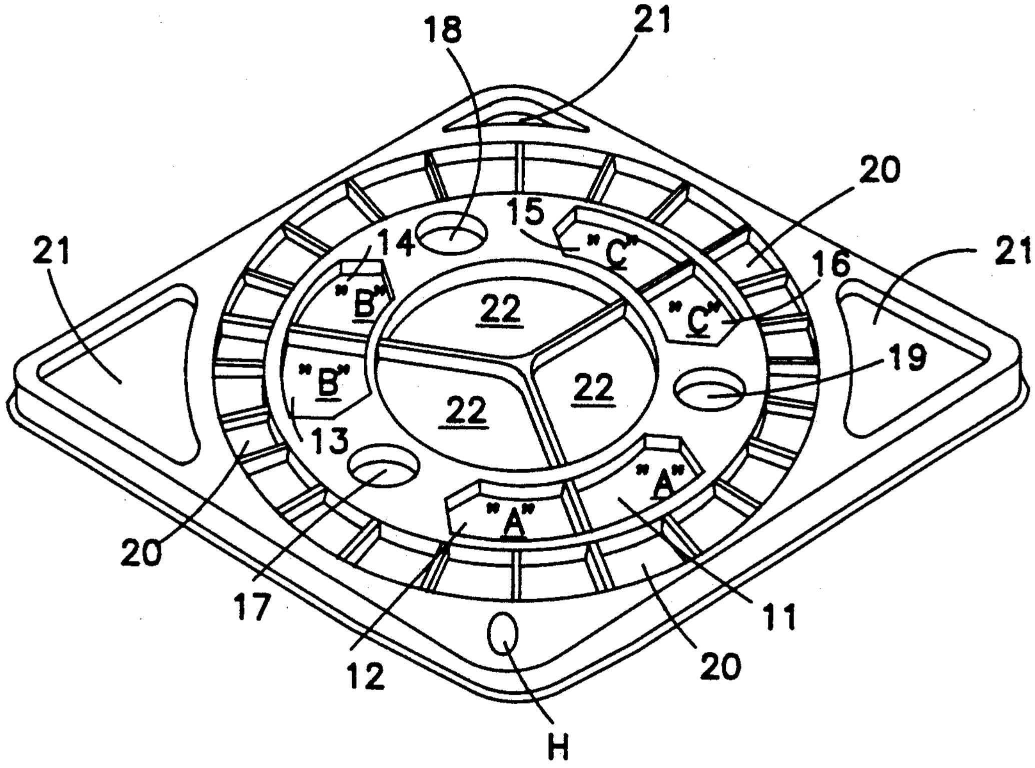
FIG. 1 is a perspective view of the upper surface of the palette.
Figure 2:
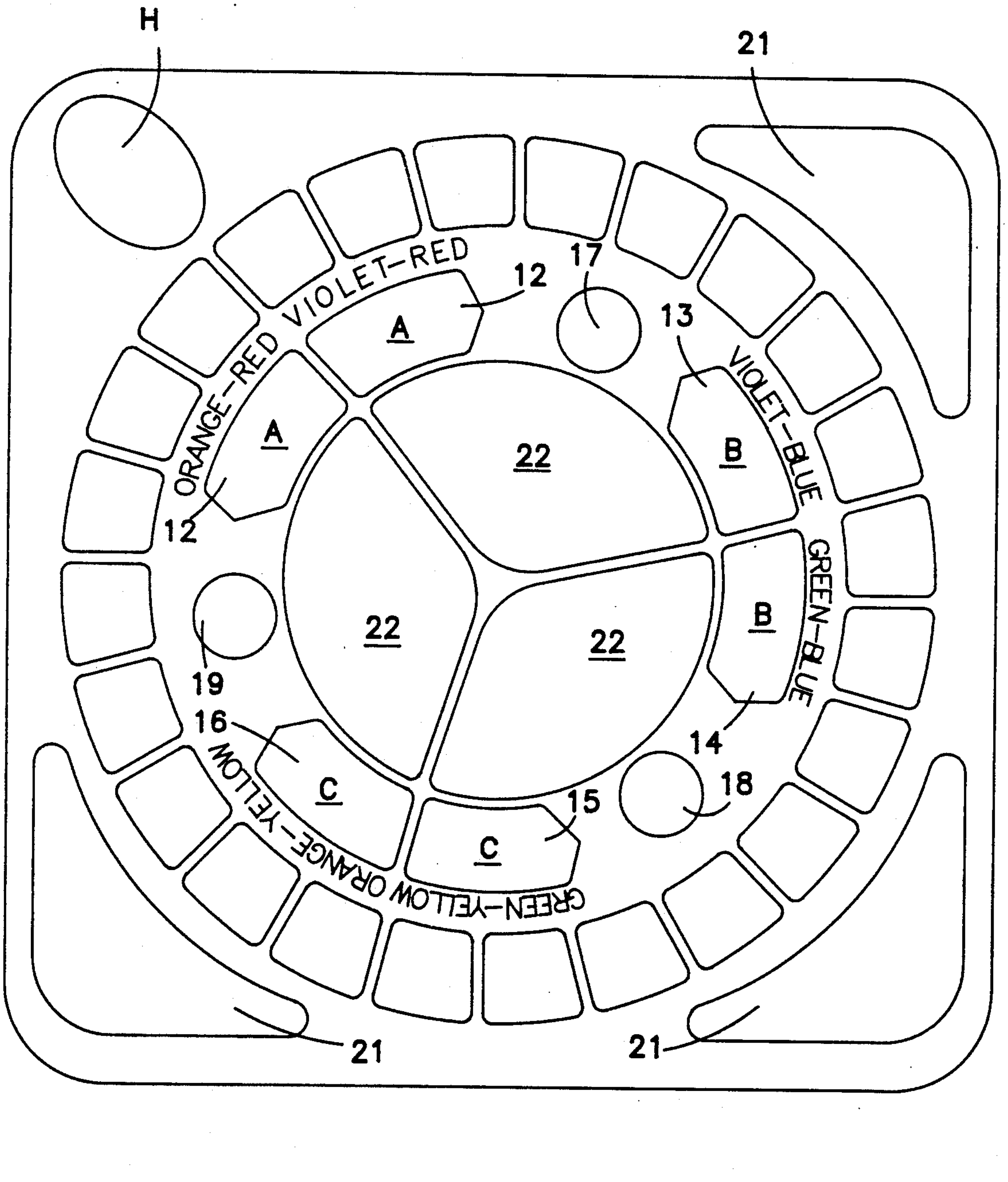
FIG. 2 is a plan view of the upper surface of the palette.

As shown in FIG. 1 and 2 the main working area of the palette is of circular configuration and is provided with the usual thumb hole H and with three pairs of designated areas A, B, C in the form of recesses 11, 12, 13, 14, 15 and 16 located equidistantly and in an adjacent relationship around the palette. The pairs of recesses are provided to receive a primary colour as follows:

A—Red

B—Blue

C—Yellow

Each recess is provided with directional indicia whereby one end of each recess is arrow shaped and pointing to the adjacent pair of recesses.

Figure 3:
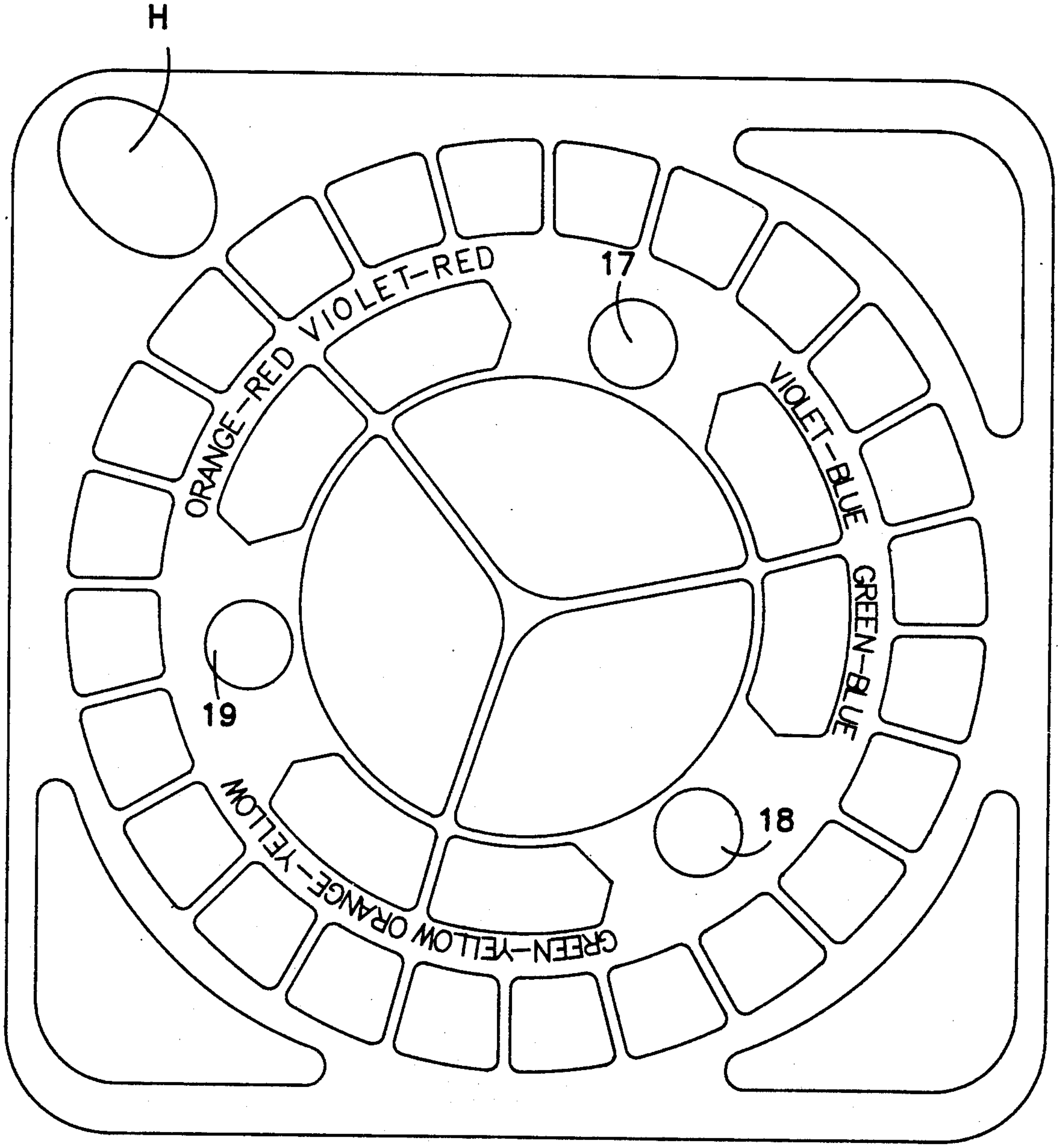
FIG. 3 is a plan view of the upper surface of the palette with the primary colours in place.

Each recess of each pair is to receive a primary colour with an intermediate colour bias wherein adjacent recesses of adjacent pairs which are directed to each other by means of the arrow shaped recess ends receives a primary colour with a common intermediate colour bias. Each designated area is marked for example printed or embossed, with a description of the colours to be placed in them as illustrated in FIG. 3.

In area A which receives the primary colour red, recess 11 receives red with an orange bias and recess 12 receives red with a violet bias.

In area B which receives the primary colour blue, recess 13 receives blue with a violet bias and recess 14 receives blue with a green bias.

In area C which receives the primary colour yellow, recess 15 receives yellow with a green bias and recess 16 receives yellow with an orange bias.

The palette is also provided with three areas in the form of circular recesses 17, 18 and 19, each circular recess being positioned between each pair of recesses.

Circular recess 17 is positioned between recesses 12 and 13, circular recess 18 is positioned between recesses 14 and 15, and circular recess 19 is positioned between recess 16 and 11. The circular receses 17, 18 and 19 are to receive an intermediate colour either orange, violet or green which is created by combining in the circular recess the primary colours having a common intermediate colour which are received in the adjacent recesses.

Figure 4:
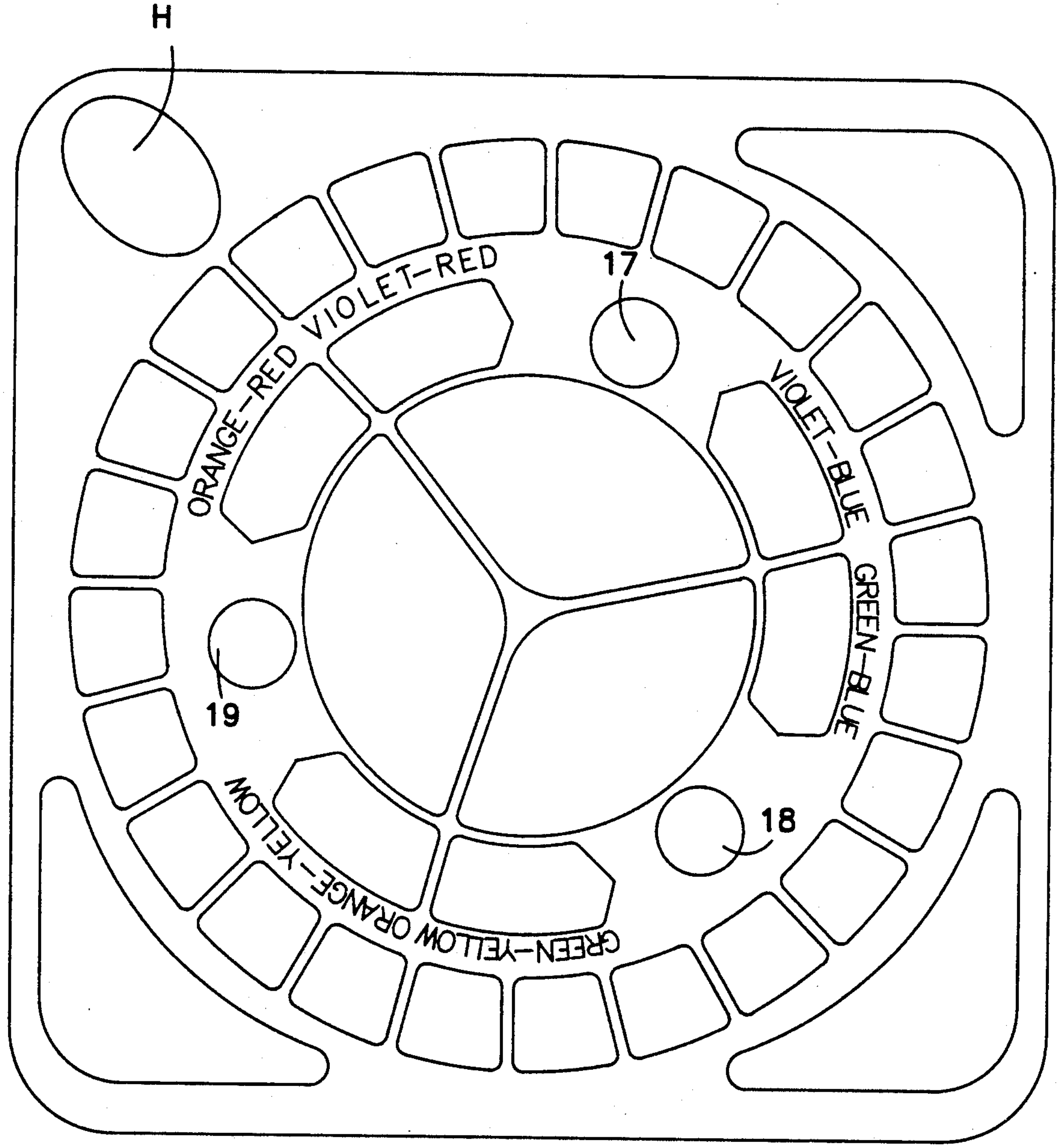
FIG. 4 is a plan view of the upper surface of the palette illustrating how a pure intermediate colour is formed.

By mixing in circular recess 17 blue with a violet bias and red with a violet bias, a clear violet results, see FIG. 4.

By mixing in circular recess 18 blue with a green bias and yellow with a green bias, a clear green results.

By mixing in circular recess 19 yellow with an orange bias recess 16 and red with an orange bias recess 11, a clear orange results.

An outer series of recesses 20 are arranged adjacent the periphery of the palette and can be used for mixing various colours. By using the arrows it is possible to obtain desired colours readily.

Figure 5:
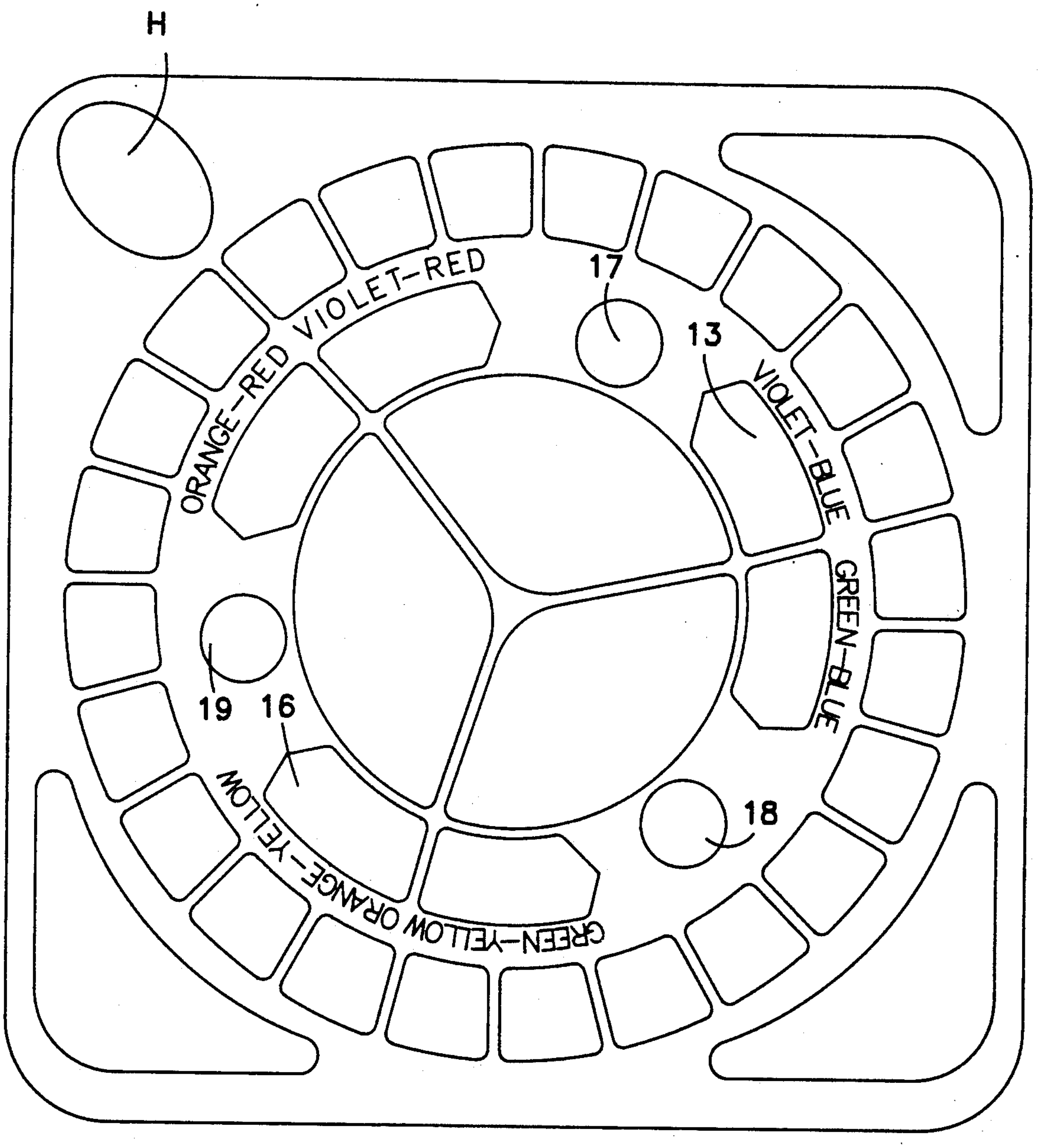
FIG. 5 is a plan view of the upper surface of the palette illustrating how a neutralized intermediate colour is formed.

If a slightly neutralised intermediate colour is required then one selects colours opposite to the arrows. For example to obtain a dull green one selects colours in arrow recesses pointing away from the green recess 18 i.e. recesses 16 and 13, see FIG. 5.

Corner recesses 21 and inner recesses 22 may be used for white or for bulk mixes intended for washes and the like.

If desired more than one colour may be placed in each of the arrow recesses. Several orange reds such as vermillion, or cadmium red could be placed in the arrow recess 11.

Figure 6:
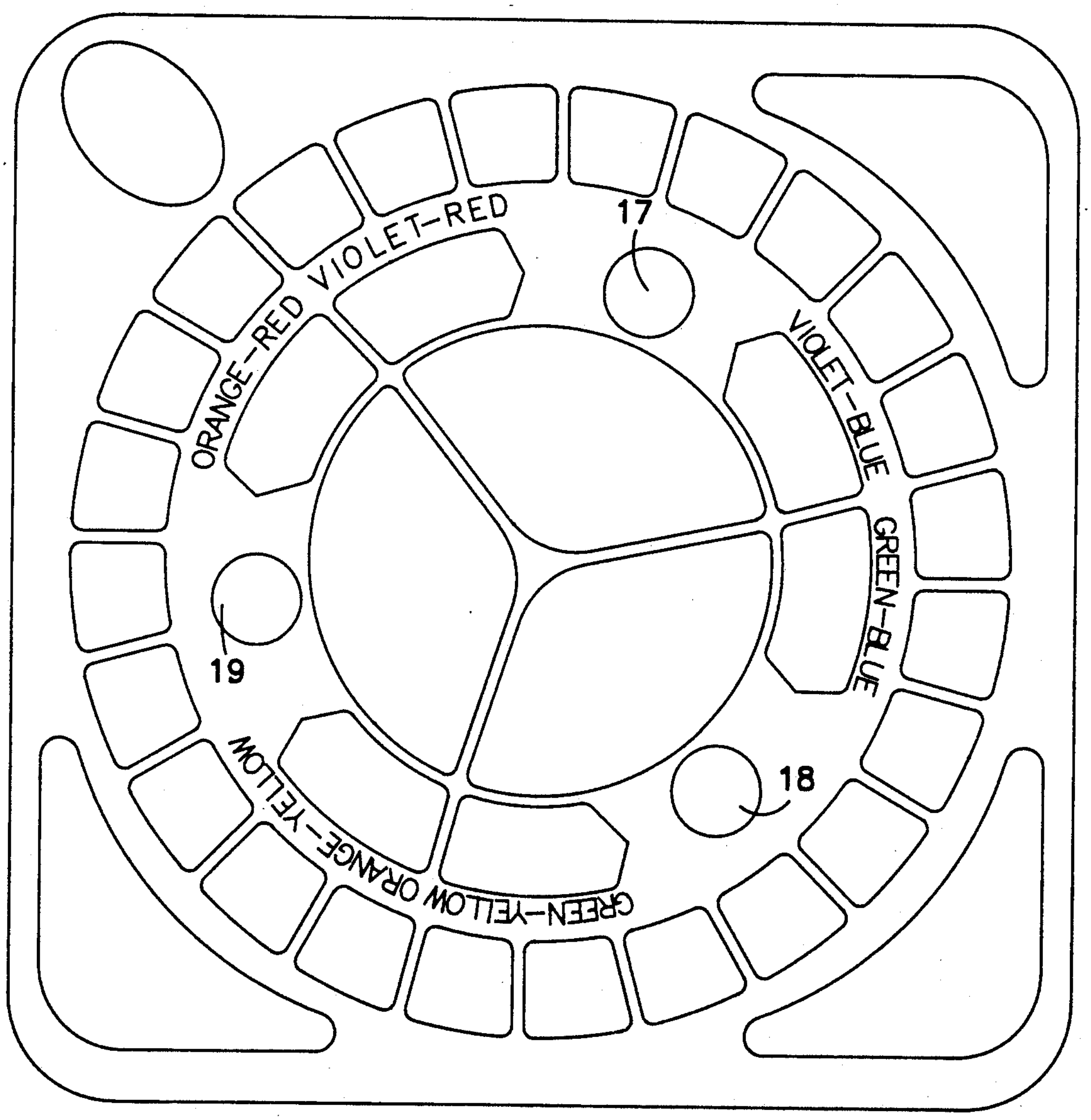
FIG. 6 is a plan view of the upper surface of the palette illustrating how to darken a pure intermediate colour.

Darker colours and greys are produced by taking colours from opposite sides of the palette. For example to darken a red the artist simply goes to the opposite recess 18 for some green. This is mixed with the red in one of the outer recesses 20, see FIG. 6.

The advantage of the present invention over previous artist's palettes is that the result of mixing any of the so placed colours can be predicted by the layout of the palette. This benefits in the teaching of colour mixing whereby the mixing of colours can be taught without the need to actually place or mix the colours on the palette. Therefore the palette also acts as a colour mixing guide.

Whilst the invention has been described with particular reference to one specific embodiment it is not limited thereto. Many modifications are possible. For example, the primary colour recesses instead of being arrow shaped may be any shape and have an arrow printed or moulded adjacent thereto. Likewise the palette may not have recesses in which case the various areas would be indicated by printed or moulded lines. The palette may be circular instead of rectangular or of the traditional palette shape.

What is claimed is:

1. An artist's palette of any suitable configuration having at least three pairs of designated areas in an adjacent relationship;
 each of said pairs of designated areas being provided to receive a first colour;
 each designated area of each of said pairs having directional indicia towards the adjacent pair of designated areas,
 each designated area of each of said pairs being provided to receive a first colour with an second colour bias wherein adjacent designated areas of adjacent pairs have said directional indicia towards each other and receive a first colour having a common second colour bias;
 said palette having at least three, each of said areas positioned between adjacent pairs of designated areas;
 each of said areas being provided to receive a second colour created by combining the first colours having a common second colour bias in said adjacent designated areas.

2. An artist's palette as claimed in claim 1 wherein said first colour is a primary colour.

3. An artist's palette as claimed in claim 1 wherein said second is an intermediate colour.

4. An artist's palette of any suitable configuration having at least three pairs of designated areas in an adjacent relationship;
 each of said pairs of designated areas being provided to receive a primary colour;
 each designated area of each of said pairs having directional indicia towards the adjacent pair of designated areas,
 each designated area of each of said pairs being provided to receive a primary colour with an intermediate colour bias wherein adjacent designated areas of adjacent pairs have said directional indicia towards each other and receive a primary colour having a common intermediate colour bias;
 said palette having at least three areas, each of said areas positioned between adjacent pairs of designated areas;
 each of said areas being provided to receive an intermediate colour created by combining the primary colours having a common intermediate colour bias in said adjacent designated areas.

5. An artist's palette as claimed in claim 4 wherein said primary colours are red, blue and yellow.

6. An artist's palette as claimed in claim 4 wherein said intermediate colours are violet, green and orange.

7. An artist's palette as claimed in claim 1 wherein the first of said pairs of designated areas being provided to receive blue with a bias towards violet and a blue with a bias towards green;
 the second of said pairs of designated areas being provided to receive yellow with a bias towards orange and yellow with bias toward green;
 the third of said pairs of designated areas being provided to receive red with a bias towards violet and red with a bias towards orange.

8. An artist's palette as claimed in claim 1 wherein in the first of said areas blue with a bias towards violet is mixed with red with a bias towards violet to result in clear violet;
 in the second of said areas red with a bias towards orange is mixed with yellow with a bias towards orange to result in clear orange;
 in the third of said areas yellow with a bias towards green is mixed with blue with a bias towards green to result in a clear green.

9. An artist's palette as claimed in claim 1 wherein said designated areas are configured to provide said directional indicia.

10. A colour mixing guide comprising an artist's palette of any suitable configuration having at least three pairs of designated areas in an adjacent relationship;
 each of said pairs of designated areas being provided to receive a first colour;
 each designated area of each of said pairs having directional indicia towards the adjacent pair of designated areas,
 each designated area of each of said pairs being provided to receive a first colour with a second colour bias wherein adjacent designated areas of adjacent pairs have said directional indicia towards each other and receive a first colour having a common second colour bias;
 said palette having at least three areas, each of said areas positioned between adjacent pairs of designated areas;
 each of said areas being provided to receive a second colour created by combining the first colours having a common second colour bias in said adjacent designated areas.

11. A colour mixing guide as claimed in claim 10 wherein said first colour is a primary colour.

12. A colour mixing guide as claimed in claim 10 wherein said second colour is an intermediate colour.

13. A colour mixing guide comprising an artist's palette of any suitable configuration having at least three pairs of designated areas in an adjacent relationship;
 each of said pairs of designated areas being provided to receive a primary colour;
 each designated area of each of said pairs having directional indicia towards the adjacent pair of designated areas,
 each designated area of each of said pairs being provided to receive a primary colour with an intermediate colour bias wherein adjacent designated areas of adjacent pairs have said directional indicia towards each other and receive a primary colour having a common intermediate colour bias; said palette having at least three areas, each of said areas positioned between adjacent pairs of designated areas;

each of said areas being provided to receive an intermediate colour created by combining the primary colours having a common intermediate colour bias in said adjacent designated areas.

14. A colour mixing guide as claimed in claim 13 wherein said primary colours are red, blue and yellow.

15. A colour mixing guide as claimed in claim 13 wherein said intermediate colours are violet, green and orange.

16. A color mixing guide as claimed in claim 10 wherein the first of said pairs of designated areas being provided to receive blue with a bias towards violet and blue with a bias towards green;

the second of said pairs of designated areas being provided to receive yellow with a bias towards orange and yellow with a bias towards green;

the third of said pairs of designated areas being provided to receive red with a bias towards violet and red with a bias towards orange.

17. A colour mixing guide as claimed in claim 10 wherein the first of said areas is provided to receive a clear violet which results from mixing blue with a bias towards violet and red with a bias towards violet;

the second of said areas is provided to receive a clear orange which results from mixing red with a bias towards orange and yellow with a bias towards orange;

the third of said areas is provided to receive a clear green which results from mixing yellow with a bias towards green and a blue with a bias towards green.

18. A colour mixing guide as claimed in claim 10 wherein said designated areas are configured to provide said directional indicia.

19. An artist's palette as claimed in claim 4 wherein the first of said pairs of designated areas being provided to receive blue with a bias towards violet and a blue with a bias towards green;

the second of said pairs of designated areas being provided to receive yellow with a bias towards orange and yellow with a bias towards green;

the third of said pairs of designated areas being provided to receive red with a bias towards violet and red with a bias towards orange.

20. An artist's palette as claimed in claim 4 wherein in the first of said areas blue with a bias towards violet is mixed with red with a bias towards violet to result in clear violet;

in the second of said areas red with a bias towards orange is mixed with yellow with a bias towards orange to result in clear orange;

in the third of said areas yellow with a bias towards green is mixed with blue with a bias towards green to result in a clear green.

21. An artist's palette as claimed in claim 4 wherein said designated areas are configured to provide said directional indicia.

22. A color mixing guide as claimed in claim 13 wherein the first of said pairs of designated areas being provided to receive blue with a bias towards violet and blue with a bias towards green;

the second of said pairs of designated areas being provided to receive yellow with a bias towards orange and yellow with a bias towards green;

the third of said pairs of designated areas being provided to receive red with a bias towards violet and red with a bias towards orange.

23. A color mixing guide as claimed in claim 13 wherein the first of said areas is provided to receive a clear violet which results from mixing blue with a bias towards violet and red with a bias towards violet;

the second of said areas is provided to receive a clear orange which results from mixing red with bias towards orange and yellow with a bias towards orange;

the third of said areas is provided to receive a clear green which results from mixing yellow with a bias towards green and a blue with a bias towards green.

24. A color mixing guide as claimed in claim 13 wherein said designated areas are configured to provide said directional indicia.

* * * * *

UNITED STATES PATENT AND TRADEMARK OFFICE

CERTIFICATE OF CORRECTION

PATENT NO. : 5,209,664

DATED : May 11, 1993

INVENTOR(S) : Michael A.J. Wilcox

It is certified that error appears in the above-identified patent and that said Letters Patent is hereby corrected as shown below:

Column 3, line 34, insert --areas- after "three".

Signed and Sealed this

Eleventh Day of January, 1994

Attest:

BRUCE LEHMAN

*Attesting Officer* *Commissioner of Patents and Trademarks*